(12) United States Patent
DeLeeuw

(10) Patent No.: US 6,359,631 B2
(45) Date of Patent: *Mar. 19, 2002

(54) METHOD OF ENABLING DISPLAY TRANSPARENCY FOR APPLICATION PROGRAMS WITHOUT NATIVE TRANSPARENCY SUPPORT

(75) Inventor: William C. DeLeeuw, Hillsboro, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,580

(22) Filed: Feb. 16, 1999

(51) Int. Cl.[7] .................................................. G06T 11/60
(52) U.S. Cl. ....................................... 345/629; 345/592
(58) Field of Search ................................. 345/431, 435, 345/112, 113, 114, 115, 4, 116, 125, 433, 421, 339, 340, 334, 176, 540, 344, 343, 592, 635, 640, 629

(56) References Cited

U.S. PATENT DOCUMENTS

| | | | | |
|---|---|---|---|---|
| 4,555,775 A | * | 11/1985 | Pike | 345/344 |
| 5,212,770 A | * | 5/1993 | Smith | 345/335 |
| 5,574,836 A | * | 11/1996 | Broemmelsiek | 345/427 |
| 5,748,866 A | * | 5/1998 | Edgar | 345/428 |
| 5,831,615 A | * | 11/1998 | Drews et al. | 345/344 |
| 5,841,420 A | * | 11/1998 | Kaply et al. | 345/118 |
| 5,850,232 A | * | 12/1998 | Engstrom et al. | 345/511 |
| 5,999,191 A | * | 12/1999 | Frank et al. | 345/435 |
| 6,038,031 A | * | 3/2000 | Murphy | 382/254 |
| 6,118,427 A | * | 9/2000 | Buxton et al. | 345/113 |

OTHER PUBLICATIONS

U.S. Patent Application No. 09/085,548, entitled "A Method of Creating Transparent Graphics," filed May 27, 1998, 25 page specification, 8 pages of drawings.

* cited by examiner

Primary Examiner—Jeffery Brier
Assistant Examiner—Thu-Thao Havan
(74) Attorney, Agent, or Firm—Steven P. Skabrat

(57) ABSTRACT

A transparent layer of display data may be provided over the top of another layer of display data on a display so that the user may see both layers clearly and simultaneously. This capability may be provided without employing modifications to the application program generating the data to be displayed transparently. That is, transparency effects may be provided for the display output data of application programs that do not have native transparency support. Embodiments of the present invention provide a generalized interface for accessing transparent display features by an application program. Creating transparent graphics for an application program lacking native transparency support includes selecting a virtual display to receive display data output from the application program, displaying non-transparent display data on a primary display, drawing the display data on the virtual display, and representing the display data from the virtual display transparently on the primary display along with the non-transparent display data.

25 Claims, 13 Drawing Sheets

| T + OS MIX | OS | T + OS MIX | OS | T + OS MIX | OS | • • • |
| OS | T + OS MIX | OS | T + OS MIX | OS | T + OS MIX | |
| T + OS MIX | OS | T + OS MIX | OS | T + OS MIX | OS | |
| OS | T + OS MIX | OS | T + OS MIX | OS | T + OS MIX | • • • |

FIG. 5

METHOD OF ENABLING DISPLAY TRANSPARENCY FOR APPLICATION PROGRAMS WITHOUT NATIVE TRANSPARENCY SUPPORT

BACKGROUND

1. Field

The present invention relates generally to graphical user interfaces and, more specifically, to generating transparent graphics displays.

2. Description

In the days of "dumb" terminals and early personal computers (PCs), a user could typically view only one set of information at a time on a computer display. With the advent of windowing features of graphical user interfaces in some operating system software, a user may view multiple sets of information in multiple windows shown on the display. In some cases, the windows are overlapping, and in other cases the windows are non-overlapping (or tiled). While the windowing capability has proven advantageous for increasing the amount of information displayed to the user on a single display, it still is limited in that when two or more windows are overlapping, the window in the foreground obscures or blocks the user's view of the overlapped portion of the window in the background. The foreground window also blocks input access to the overlapped portion of the background window. The user typically must perform some action, such as a cursor movement, keyboard input strike or mouse input event, to cause the background window to be changed to the foreground window, thereby allowing the user to fully view its contents or provide input signals to the system.

One approach to overcoming this drawback of windowing systems is to provide the capability for simultaneous viewing of the entire contents of multiple overlapping windows through the use of transparency. Transparent windows contain display data wherein objects or images beyond the transparent window (e.g., in a background window or underlying display surface) may still be perceived by the user. Transparent effects are used in some computer software games to enable features such as "heads-up" display functions.

Current implementations of transparency have at least several disadvantages. The transparent effect is typically achieved by interleaving pixels from two display buffers without the ability to adjust the level of transparency. The use of transparency results in windows with inferior viewing quality because the pixel interleaving method produces "checkerboard" artifacts in the display. Furthermore, the transparent effects are limited to pre-defined, self-contained components of specialized application programs. That is, if a user desires that at least a portion of an application program's output data be displayed in a transparent manner, the application program's code may need to be re-written to explicitly implement the transparency. As a result, it may be difficult to provide transparency for application programs that do not already provide transparency capabilities themselves. When the application programs are commercial "off-the-shelf" shrink-wrapped software, providing transparency capabilities may not be feasible.

Therefore, a need exists for the capability to represent display objects of an application program transparently over the top of other display windows and background surfaces on a display without employing modifications to the application program.

SUMMARY

An embodiment of the present invention is a method of creating transparent graphics for an application program lacking native transparency support. The method includes selecting a virtual display to receive display data output from the application program, displaying non-transparent display data on a primary display, drawing the display data on the virtual display, and representing the display data from the virtual display transparently on the primary display along with the non-transparent display data.

Another embodiment of the present invention is a system for creating transparent graphics for an application program lacking native transparency support. The system includes a virtual display driver to receive display data from the application program to be displayed transparently, a primary display to display non-transparent data and the display data, and a primary display driver to control the transparent display of the display data received from the virtual display driver and the display of the non-transparent data on the primary display.

BRIEF DESCRIPTION OF THE DRAWINGS

The features and advantages of the present invention will become apparent from the following detailed description of the present invention in which:

FIG. 5 is a diagram illustrating an alternating pixel technique mixing between the transparent graphics frame buffer and the operating system output frame buffer according to one embodiment of the present invention;

DETAILED DESCRIPTION

An embodiment of the present invention comprises a method and system for providing a transparent layer of display data over the top of another layer of display data on a display so that the user may see both layers clearly and simultaneously. Embodiments of the present invention provide this capability without employing modifications to the application program generating the data to be displayed transparently. That is, transparency effects may be provided for the display output data of application programs that do not have native transparency support. Embodiments of the present invention provide a generalized interface for accessing transparent display features by an application program such that drawing operations by the application program to the display may become transparent without modifying the application program.

Reference herein to "one embodiment" or "an embodiment" means that a particular feature, structure or characteristic described in connection with the embodiment is included in at least one embodiment of the present invention. Thus, the appearances of the phrase "in one embodiment" in various places throughout the specification are not necessarily all referring to the same embodiment.

The transparency capability doubles, in essence, the maximum screen area available on a display for use by application programs. One embodiment comprises a method for producing transparent computer graphics layers by interleaving (or alternating in a pattern) the pixels from one video frame buffer with the pixels from another video frame buffer. In this embodiment, the pixels from a first frame buffer are mixed by color averaging with corresponding pixels from a second frame buffer to reduce the "checkerboard" effect created by the use of spatial multiplexing alone. Additionally, because the degree of interleaving is adjustable and the color averaging may be weighted, the degree of transparency of the displayed images may be controlled.

An embodiment of the present invention operates by combining two frame buffers of computer graphics output data or video data in the form of electrical signals. The pixels of the output, or visible, frame buffer are created by spatially interleaving the contents of two input frame buffers. The interleaving in this embodiment is accomplished by alternating pixels of one frame buffer with those of the other frame buffer. This results in the visual illusion of two displays of images layered one on another. As the pixels are being interleaved, the pixels of the first frame buffer are color averaged with the pixels of the second frame buffer that they are about to replace. Color averaging is performed on the pixels of one frame buffer by averaging them with the corresponding pixels of the other frame buffer prior to, or during, interleaving them into the output frame buffer. The result comprises multiple overlapping images being substantially simultaneously visible on a display, such as a computer monitor, for example.

Figure 1:
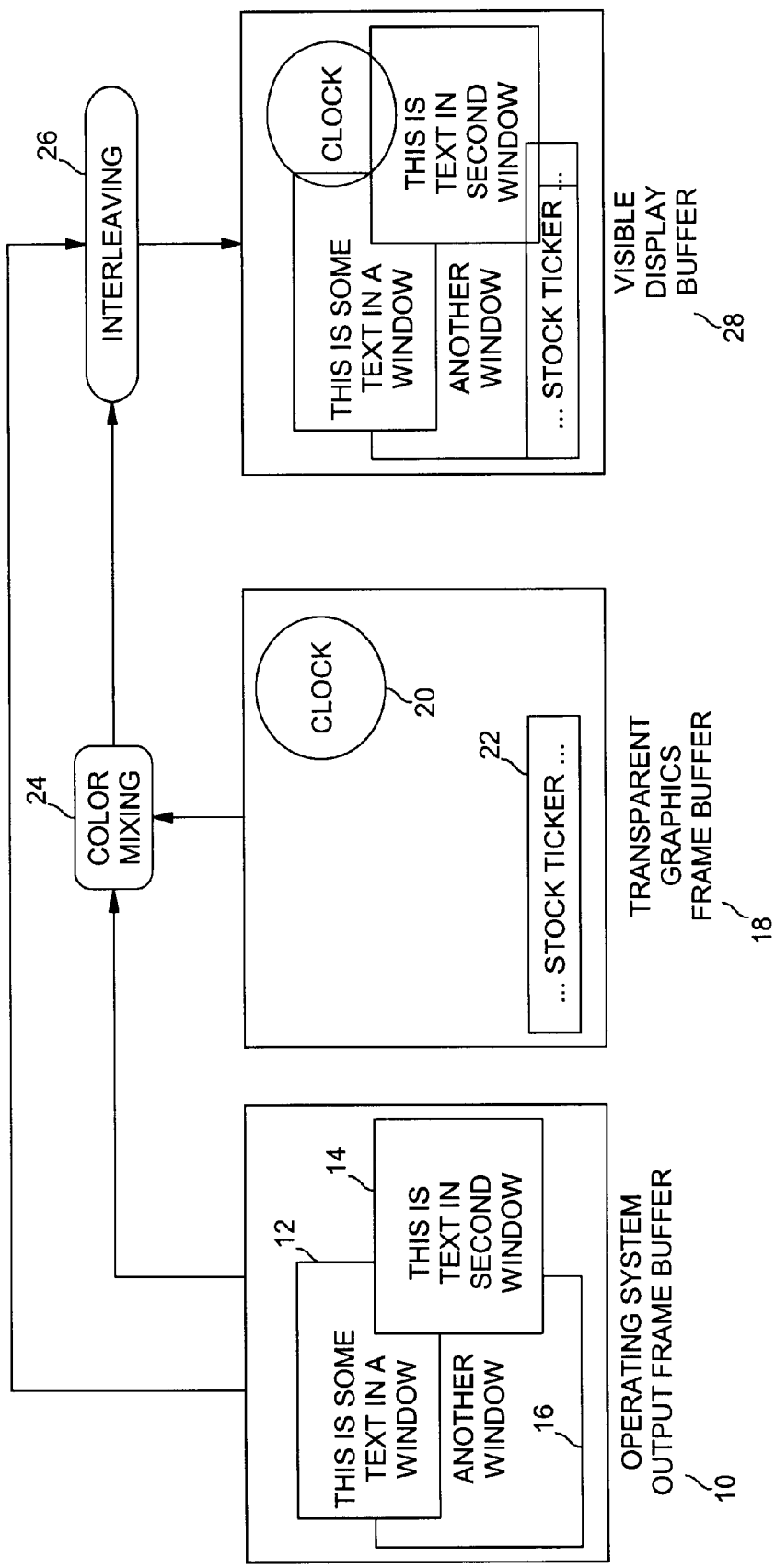
FIG. 1 is a diagram illustrating an example of transparent graphics displayed with operating system output graphics according to an embodiment of the present invention.

FIG. 1 is a diagram illustrating an example of transparent graphics displayed with operating system output graphics according to an embodiment of the present invention. Operating system output frame buffer 10 is an area of memory used to store the current display data of the computer system (not shown). The operating system output frame buffer may be allocated in any memory available to the operating system. A frame buffer is a set of storage locations to store a two-dimensional array of pixel data. The operating system output frame buffer may be associated with operating system software of the computer system, which controls the generation and display of the data signals on a computer monitor (not shown in FIG. 1). In one embodiment, the operating system software comprises the Windows 95®, Windows 98®, or Windows NT® operating system software available from Microsoft Corporation, although other operating system software supporting graphical user interfaces may also be employed. In this example, the operating system output frame buffer 10 contains application program display data signals for three overlapping windows shown pictorially in FIG. 1 and labeled 12, 14, and 16, respectively.

Transparent graphics frame buffer 18 is an area of memory used to store the display data of transparent graphics for substantially simultaneous display with the display data signals of the operating system output frame buffer. This area of memory may be allocated in any memory available in the system. In this example, display components such as a clock 20 and stock ticker 22 are shown as sample application program display features which illustrate the use of transparency, although generally any display components or objects may be made transparent through the use of embodiments of the present invention.

The display components of the operating system output frame buffer and the transparent graphics frame buffer may be combined by color mixing 24 the corresponding pixels of each buffer while interleaving the resulting pixels of the color mixing operation with the operating system output frame buffer's pixels to form the display components of visible display buffer 28. The visible display buffer shows in pictorial form the three overlapping windows 12, 14, and 16 with the clock 20 and stock ticker 22 displays appearing as transparent display components overlaying portions of the windows. In this example, the transparent display components are partially overlaying the other display components. However, it should be understood that the transparent display components may be entirely within the boundaries of one or more non-transparent windows or display components on the display. Of course, in certain application programs and with certain display components, the display of data from two display components with one substantially or even completely on top of the other may present image quality problems for the user. Nonetheless, in other application programs the ability to overlay transparent display components in a well designed manner is advantageous and desirable.

In addition, embodiments of the present invention allow transparent display components overlaying background windows to have little or no effect on input operations to a selected background window. For example, a user may interact with an input window of an application program being displayed in a background window while a transparent display component is partially or completely overlaying the background window. The operating system software may accept the user input events or key strikes to the input window (such as a mouse entry or text entry) without substantial interference with the display of the transparent display components.

In accordance with embodiments of the present invention, a method for producing transparency effects employs minimal mixing of display contents. Instead, it relies on the human eye's inability to distinguish between the color of adjacent pixels on a computer monitor (in essence, the human eye averages each pixel with its neighbor). Some mixing is employed, because large computer monitors and low display resolutions may result in a "checkerboard" effect when pixels are interleaved in this manner. In one embodiment, one half of the pixels from a first frame buffer (such as the operating system output frame buffer) are averaged with one half of the pixels from a second frame buffer (such as the transparent graphics frame buffer) as the pixels of the two frame buffers are interleaved into a display buffer whose data is currently being rendered visible on a display. By averaging a fraction of the pixels, there may be a decrease in the processing power used when providing the transparency effect. In alternate embodiments, different percentages of pixels may be averaged (e.g., one fourth of the pixels, one eighth of the pixels, one sixteenth of the pixels, one thirty-second of the pixels, or any one Nth of the pixels where N is a positive integer), and the percentages may be changed dynamically.

Figure 2:
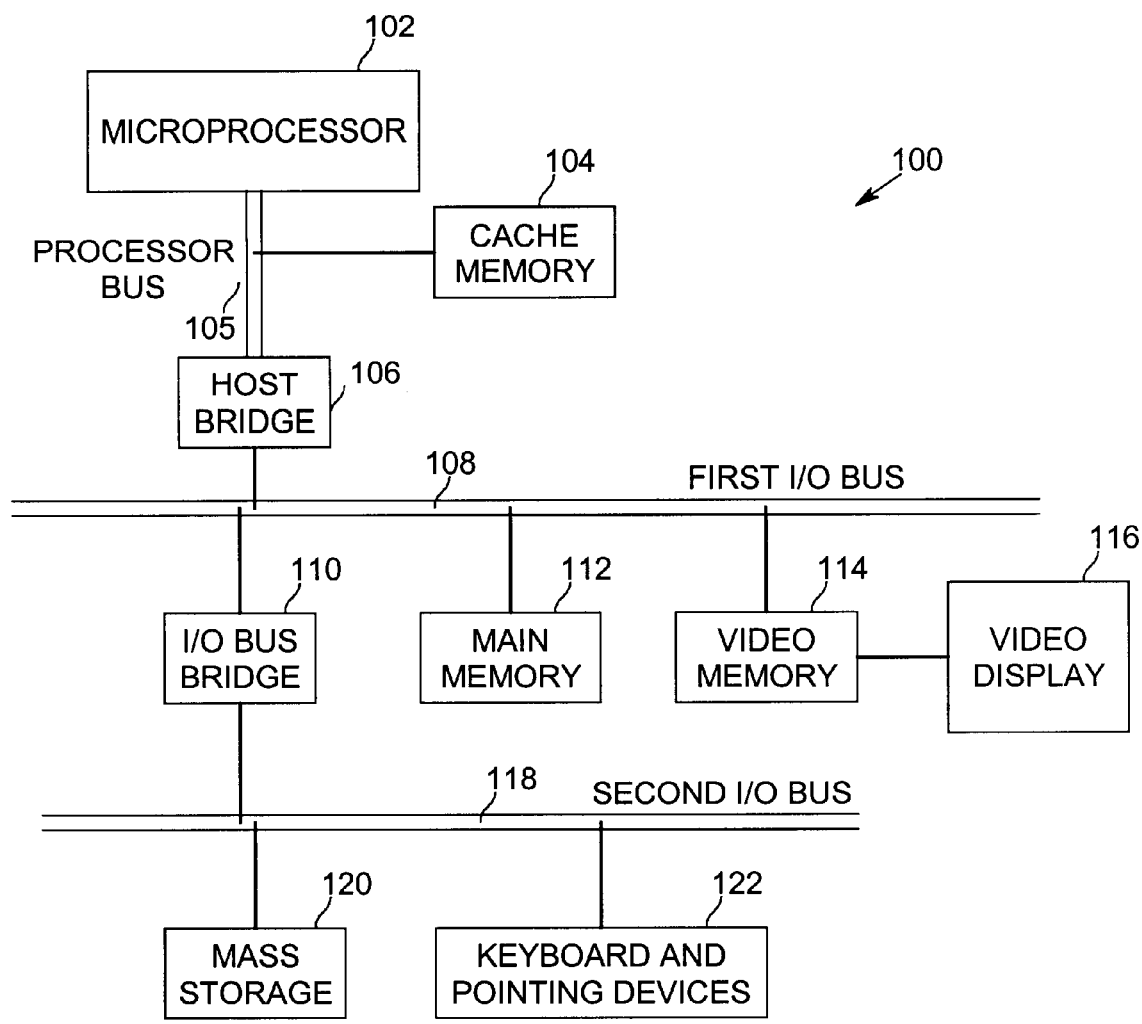
FIG. 2 is a diagram illustrating a sample system capable of being operated with a transparency method in accordance with an embodiment of the present invention.

FIG. 2 is a diagram illustrating a sample system capable of being operated with a method for producing transparency displays in accordance with the present invention. Sample system 100 may be used, for example, to execute the processing for the methods described herein. Sample system 100 is representative of computer systems based on the PENTIUM®, PENTIUM® Pro, and PENTIUM® II microprocessors available from Intel Corporation, although other systems (including personal computers (PCs) having other microprocessors, engineering workstations, set-top boxes and the like) may also be used. Sample system 100 includes microprocessor 102 and cache memory 104 coupled to each other through processor bus 105. Sample system 100 also includes first I/O bus 108 and second I/O bus 118. Processor bus 105 and first I/O bus 108 may be bridged by host bridge 106, whereas first I/O bus 108 and second I/O bus 118 may be bridged by I/O bus bridge 110. Coupled to first I/O bus 108 may be main memory 112 and video memory 114. Coupled to video memory 114 may be video display 116. Coupled to second I/O bus 118 may be mass storage 120, and keyboard and pointing devices 122.

These elements perform their conventional functions well known in the art. In particular, mass storage 120 may be used to provide long-term storage for the executable instructions for a method for providing transparent displays in accordance with embodiments of the present invention, whereas main memory 112 may be used to store on a shorter term basis the executable instructions of a method for providing transparent displays in accordance with embodiments of the present invention during execution by microprocessor 102. In addition, the instructions may be stored on other machine readable mediums accessible by the system, such as compact disk read only memories (CD-ROMs), digital versatile disks (DVDs), and floppy disks, for example.

Figure 3:
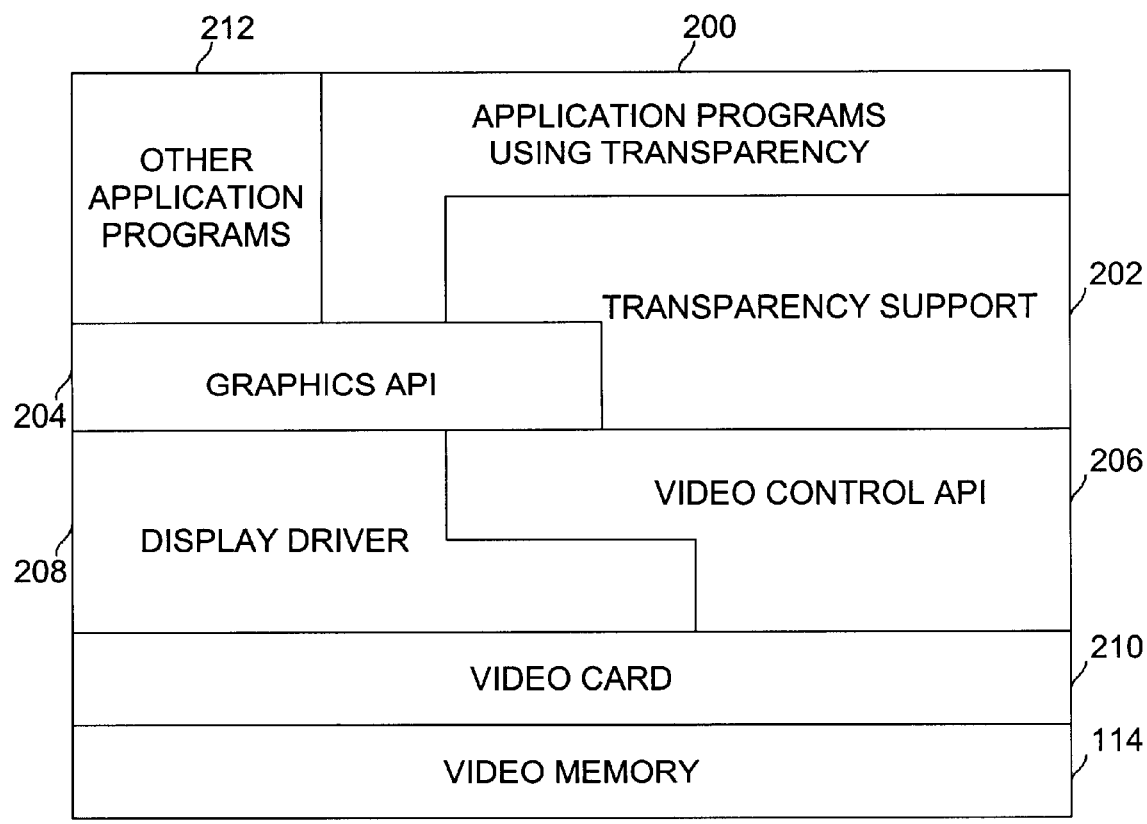
FIG. 3 is a diagram of a software and hardware stack for implementing transparent graphics according to an embodiment of the present invention.

FIG. 3 is a diagram of a software and hardware stack for implementing transparent graphics according to one embodiment of the present invention. Application programs 200 specifically designed to use transparent display objects call functions provided by transparency support software 202 to define and update the transparent display objects. That is, certain calls to such functions may be programmed into application programs in order to use transparency display features. In response, transparency support 202 calls the operating system graphics rendering application programming interface (graphics API) 204 in this embodiment. In the Windows 95® and Windows 98® operating systems, for example, this may be the Graphics Device Interface (GDI). The transparency support software 202 also calls the operating system's video hardware control abstraction application programming interface (video control API) 206 in this embodiment. In the Windows 95® and Windows 98® operating systems, this may be the DirectDraw API, available from Microsoft Corporation. In some operating systems, the graphics API 202 and video control API 206 may not be distinguishable from each other as they may exist within the same application programming interface. The graphics API 204 may be used to render requested graphics to the transparent graphics frame buffer 18 shown in FIG. 1. The video control API 206 may be used to control frame buffer visibility and to access the contents of all frame buffers. In this embodiment, the graphics API 204 and video control API 206 interact with display driver software 208 to communicate with video card 210. The video card 210 controls the video display in the system of FIG. 2. Video card accesses video memory 114 to obtain display data. Other application programs 212 which do not employ transparency interact with the graphics API 204 to create and update display objects.

Generally, images may be displayed on a display such as a computer monitor, for example, by creating a frame buffer of pixel data in video memory 114. This frame buffer may be designated as a visible portion of video memory by video control API 206. If there is a sufficient amount of video memory available, multiple frame buffers may be defined, only one of which may be used at a time (by the video card 210) to obtain the data signals for building the current visible display. In a well known double buffering technique, a first frame buffer is considered to be the "visible" buffer and the video card 210 reads data signals from it to obtain the current display data signals, while a second frame buffer (or "non-visible" buffer) is written to with new display data. In this embodiment, the video control API is then called upon to "flip" the frame buffers by designating the second frame buffer to be the visible buffer and designating the first frame buffer to be the non-visible buffer. Use of this technique provides for the smooth update of display data, resulting in aesthetically pleasing displays for the user. Embodiments of the present invention may extend this concept to employ extra frame buffers to provide the transparent display data signals in conjunction with normal display data.

Figure 4:
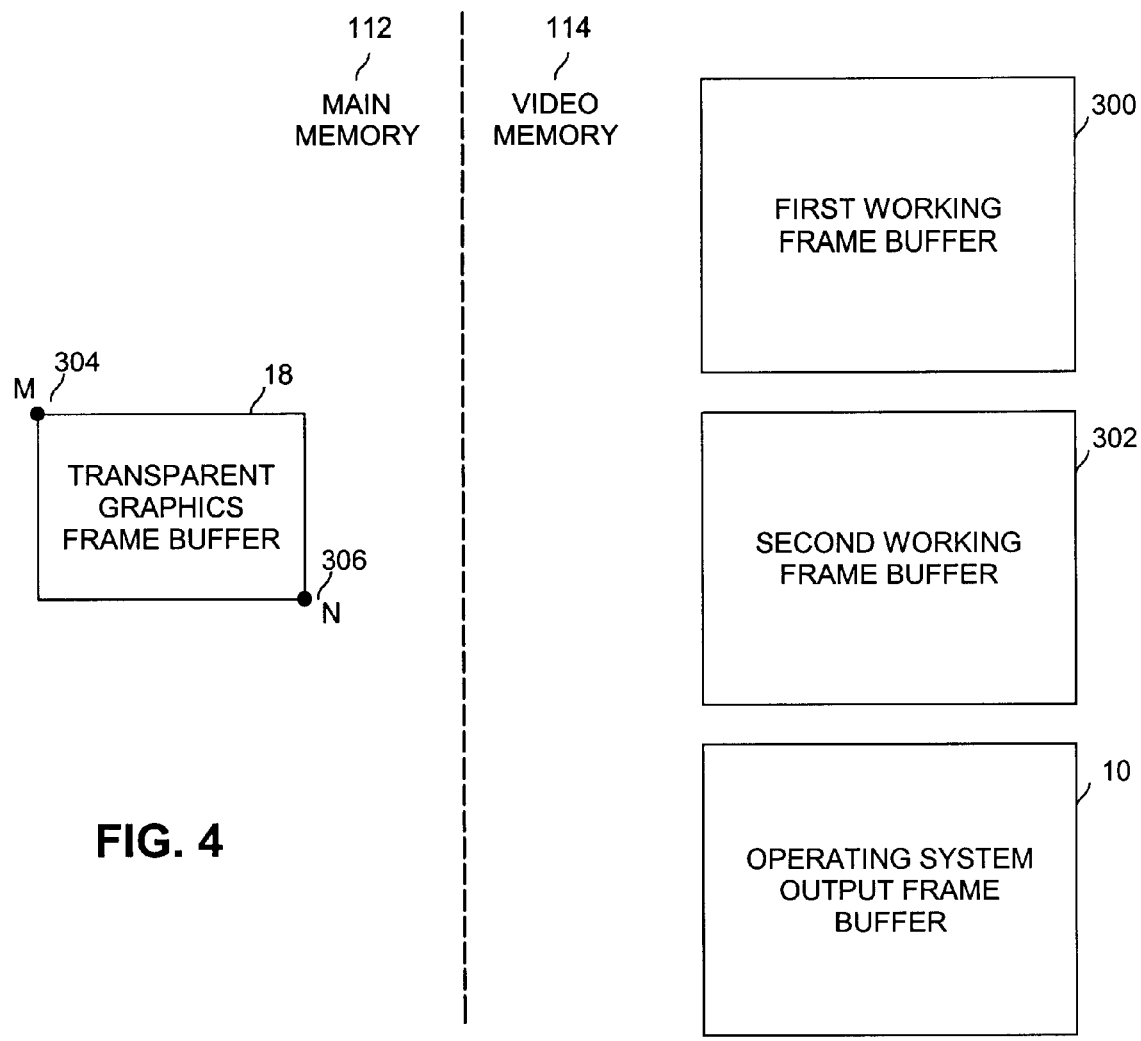
FIG. 4 is a diagram illustrating multiple frame buffers used for providing transparent graphics according to embodiments of the present invention.

FIG. 4 is a diagram illustrating an embodiment of multiple frame buffers used for providing transparent graphics. One designated portion of the video memory may be assigned to be displayed as visible on the computer monitor at a time. This is called the "visible display". That is, the visible display comprises the display data from an area of video memory that is currently displayed on the computer monitor for viewing by a user. Generally, in this embodiment the graphics API 204 of the operating system software writes data signals into the operating system output frame buffer 10 using display driver 208 and/or video control API 206. In most current systems, the operating system output frame buffer, resident in video memory 114, is used for the visible display. However, in embodiments of the present invention, other frame buffers may be used as the visible display. A first working frame buffer 300 and a second working frame buffer 302, both resident in video memory 114 or other accessible memory, store display data according to embodiments of the present invention. In this embodiment, each frame buffer stores an array of pixel data signals. The size of the array in this embodiment is dependent on the current display characteristics of the system. Frame buffer array sizes may, for example, be 640 pixels by 480 pixels, 800 pixels by 600 pixels, or 1280 pixels by 1024 pixels, or other appropriate sizes dependent on the computer monitor and operating system software settings. Each pixel includes red (R), green (G), blue (B), and optionally, opacity (A) components. Alternatively, other color coding schemes such as YUV or YUVA may also be used. Transparent graphics frame buffer 18, resident in main memory 112, in this embodiment stores transparent display data created by transparency support software 202, video control API 206, and graphics API 204.

In one embodiment, data signals from the transparent graphics frame buffer 18 may be color mixed and interleaved with data signals from operating system output frame buffer 10, and then stored in one of the working frame buffers. This mixed and interleaved data may be stored into a working frame buffer when the working frame buffer is in a "non-visible" state (that is, in this embodiment the data stored in the frame buffer is not currently displayed on the computer monitor). While one of the working frame buffers is being written to in a non-visible state, the other working frame buffer may be in a "visible" state and used as the source of current display data. When the color mixing and interleaving operations are complete for a working frame buffer, the non-visible working frame buffer may be designated the visible working frame buffer and vice versa. This double buffering process may be repeated at a rate of at least 8–15 times per second in this embodiment to provide a visually appealing display to a user.

In embodiments of the present invention, interleaving of the pixels of the transparent graphics frame buffer and the operating system output frame buffer may be accomplished as follows. In one embodiment, alternating pixels in the selected working frame buffer may be written by a mix of a transparent graphics frame buffer pixel value and a spatially corresponding operating system output frame buffer pixel value. The other pixels in the selected working frame buffer may be written with pixels from the operating system output frame buffer. In another embodiment, pixels from the operating system output frame buffer may be block transferred to the selected working frame buffer and pixels from the transparent graphics frame buffer may be subsequently spatially multiplexed and color averaged with the pixels of the selected working frame buffer.

FIG. 5 is a diagram illustrating an embodiment of one method of alternating pixel mixing between the transparent graphics frame buffer and the operating system output frame buffer. A "T+OS Mix" pixel in the selected working frame buffer comprises a color averaged mix of a pixel from the transparent graphics frame buffer (the T value) and a pixel from the operating system output frame buffer (the OS value). An "OS" pixel in the selected working frame buffer contains a spatially corresponding pixel copied from the operating system output frame buffer. In this embodiment, color averaging may be performed through a weighted averaging scheme on each color component of each pixel from corresponding positions within the two frame buffers, although in other embodiments, different color mixing techniques may also be employed. In one embodiment, weighted averaging may be accomplished by multiplying a component value of a first pixel by a weight value and multiplying the same component value of a second pixel by a different weight value. The two weighted color components may then be added together and the resulting sum may be divided by the sum of the two weight values. This method is also known as alpha blending. By using this alternating pattern, the computer processing employed to create the transparent effect may be cut in half in comparison to a mixing of all pixels of the frame buffers. The pixel data movement within the video memory may be performed by a block transfer operation provided by the drawing API in this embodiment.

Figure 6:
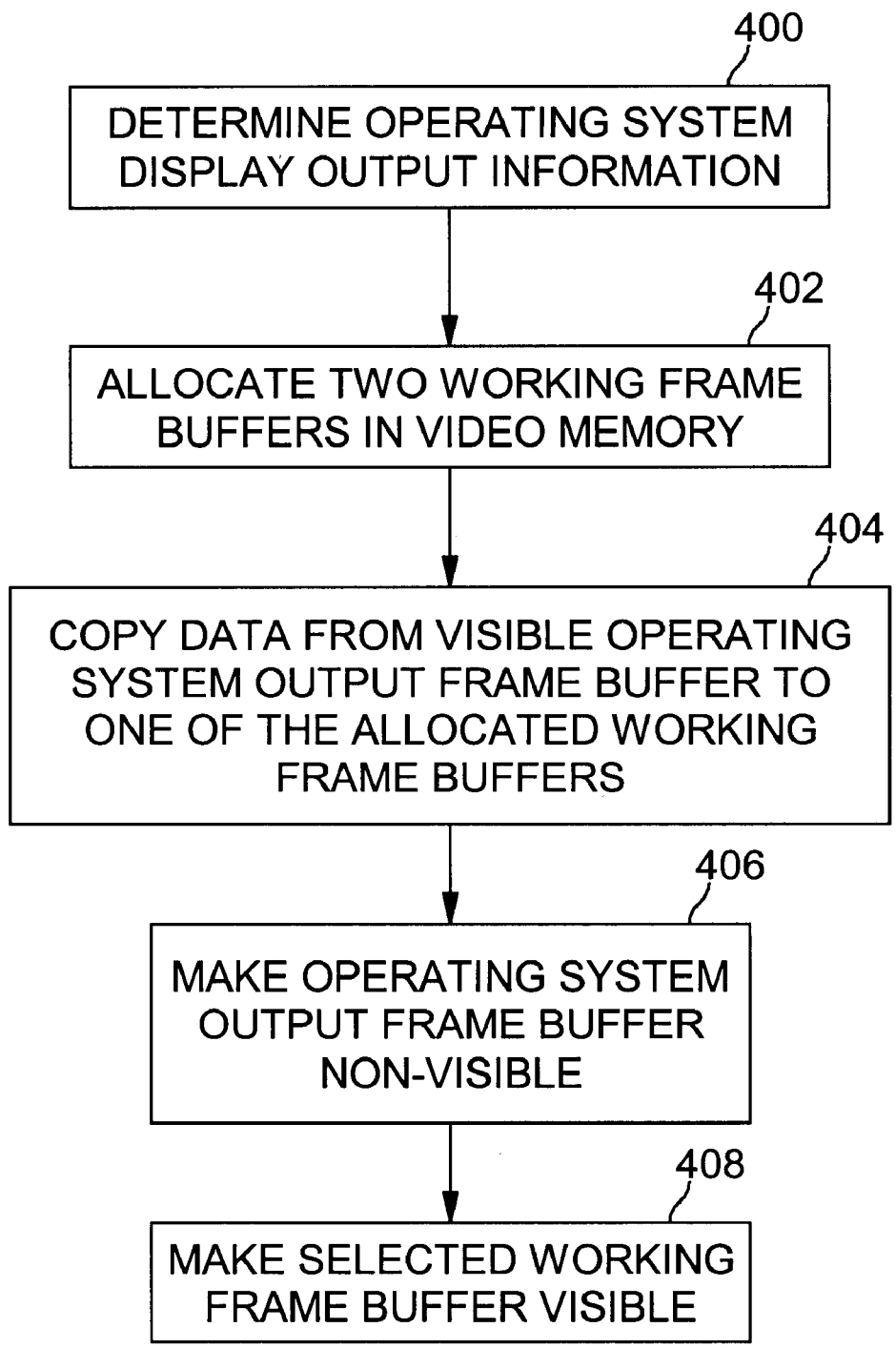
FIG. 6 is a flow diagram for initializing a system to provide transparent graphics according to one embodiment of the present invention.

FIG. 6 is a flow diagram illustrating an embodiment for initializing a system to provide transparent graphics. At block 400, the operating system display output control information may be determined. This control information comprises the size of the display, color resolution, and other data. Next, at block 402, two working frame buffers may be allocated in video memory in this embodiment. These operations may be performed by calls to the video control API in this embodiment. At block 404, a block transfer operation may be performed to copy data from the normally visible operating system output frame buffer to a selected one of the two working frame buffers. Assume for this example that the second working frame buffer is selected first, although the first working frame buffer may also be used as the initial working frame buffer. The block transfer may be performed by a call to the video control API in this embodiment. At block 406, the operating system output frame buffer may be set to a "non-visible" state by a call to the video control API. At block 408, the selected working frame buffer (for example, the second working frame buffer) may be made visible by a call to the video control API in this embodiment. In some embodiments, block 406 and block 408 may be accomplished by a single call to the video control API. At this point, the video card's current display output data is obtained from the selected working frame buffer, not the operating system output frame buffer. In alternate embodiments, other APIs may also be used to effect the same results.

Figure 7:
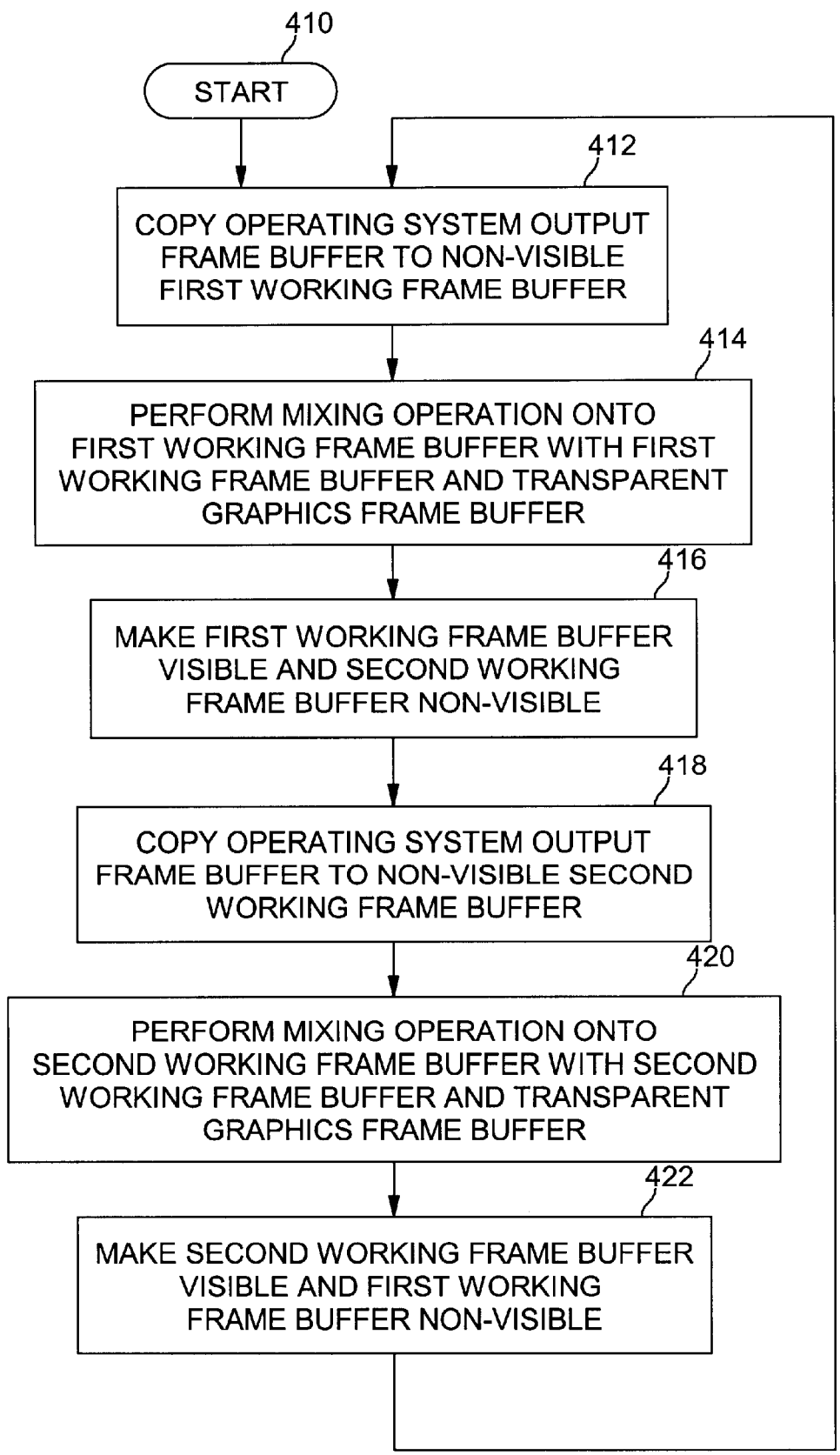
FIG. 7 is a flow diagram showing double buffering control processing according to one embodiment of the present invention.

FIG. 7 is a flow diagram showing an embodiment of double buffering control processing. After starting block 410, a block transfer operation may be performed at block 41 2 to copy the operating system output frame buffer to the non-visible first working frame buffer by a call to the video control API in this embodiment. At block 414, an operation may be performed to write the mixed and interleaved contents of the first working frame buffer and the transparent graphics frame buffer to the first working frame buffer. At block 416, the first working frame buffer is made visible and the second working frame buffer is made non-visible, in effect, flipping the two frame buffers as the current display output data source. At block 418, a block transfer operation may be performed to copy the operating system output frame buffer to the non-visible second working frame buffer by a call to the video control API in this embodiment. At block 420, an operation may be performed to write the color mixed and interleaved contents of the second working frame buffer and the transparent graphics frame buffer to the second working frame buffer. At block 422, the second working frame buffer is made visible and the first working frame buffer is made non-visible, in effect, flipping the two frame buffers as the current display output data source. This process may be repeated by returning to block 412. During each of the previous blocks, the operating system software may be concurrently writing additional display data into the operating system output frame buffer.

Figure 8:
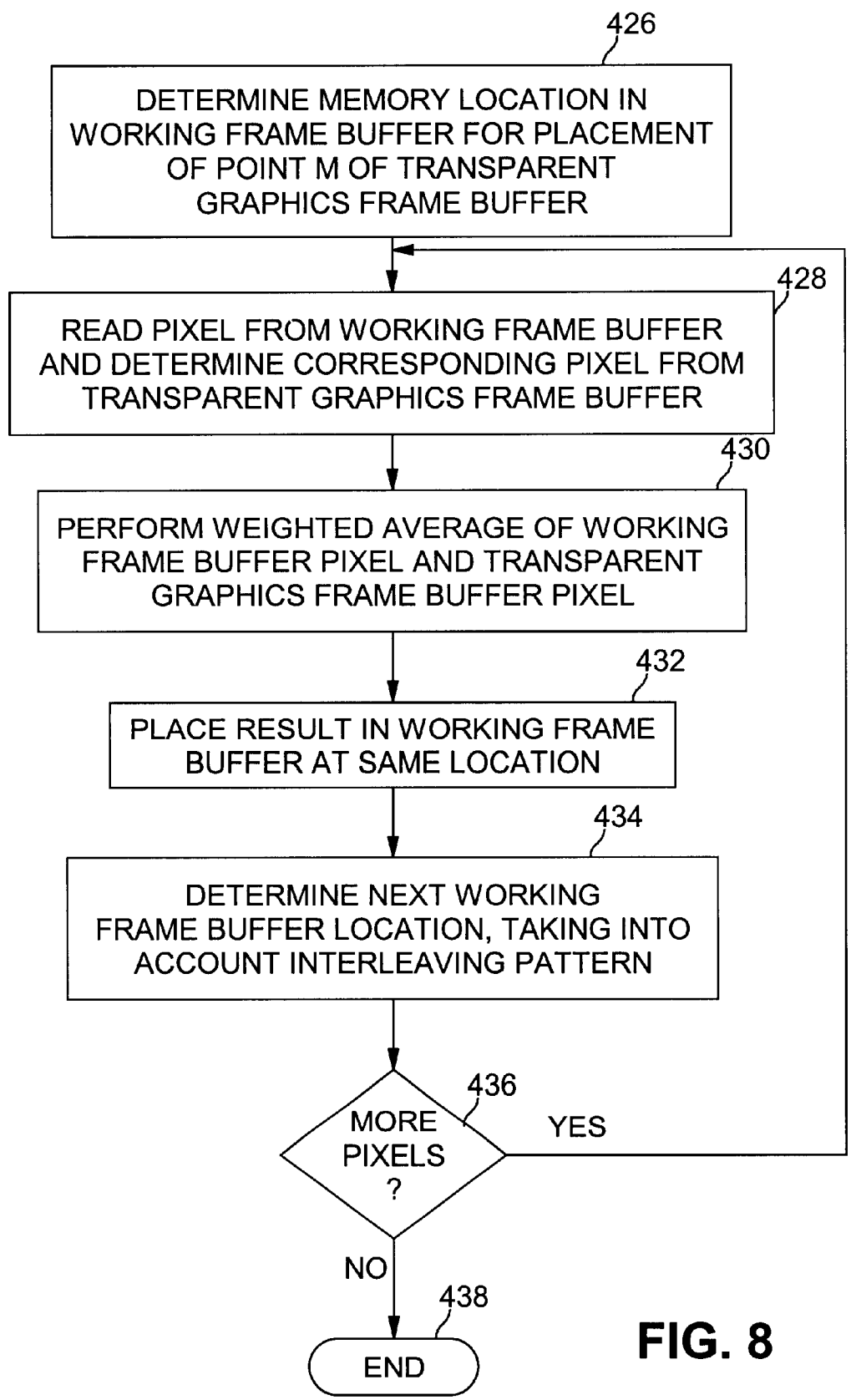
FIG. 8 is a flow diagram of color mixing and interleaving processing according to one embodiment of the present invention.

The color mixing and interleaving operation of blocks 414 and 420 is further described with reference to FIG. 8. At block 426, a memory location in the currently non-visible (either the first or the second) working frame buffer may be determined for a reference point (e.g., point M 304) of the transparent graphics frame buffer. At block 428, a data signal value for a pixel from the currently non-visible working frame buffer may be read and the spatially corresponding pixel(s) from the transparent graphics frame buffer may be determined. This correspondence is not necessarily a 1:1 ratio since the transparent graphics frame buffer image may be stretched or reduced to fit a portion of the working frame buffer. This pixel correspondence determination is well known in the art and is commonly used in stretch block transfers in operating system software (e.g., the StretchBlt function in the Windows 95® operation system). Next, at block 430, in this embodiment the weighted average of the pixel from the working frame buffer and the pixel from the transparent graphics frame buffer may be computed. The weighted averages of the individual pixel components may be determined on a color component by color component basis. That is, red components may be averaged, blue components may be averaged, and green components may be averaged. The weight that is given to each of the components determines the resulting transparency of the pixel, however the same weight value may be used for all components of a given pixel. It is the weight associated with a pixel that affects, at least in part, the level of transparency. These weights may be manipulated by the application program employing transparency to achieve various mixing ratios. Furthermore, the application program employing transparency may provide user interface elements that allow the user to control the mixing ratios directly or indirectly.

The result of the weighted averaging computation may be placed into the same location in the working frame buffer at block 432 as the current pixel being processed. At block 434, the next location in the working frame buffer to be processed may be determined, taking into account the current interleaving pattern (e. g., using every second pixel, every fourth pixel, horizontally or vertically alternating lines, etc.). At block 436, if more pixels of the working frame buffer and the transparent graphics frame buffer are to be processed, processing continues with block 428 with the next pixel. Otherwise, color mixing and interleaving processing ends at block 438.

Figure 9:
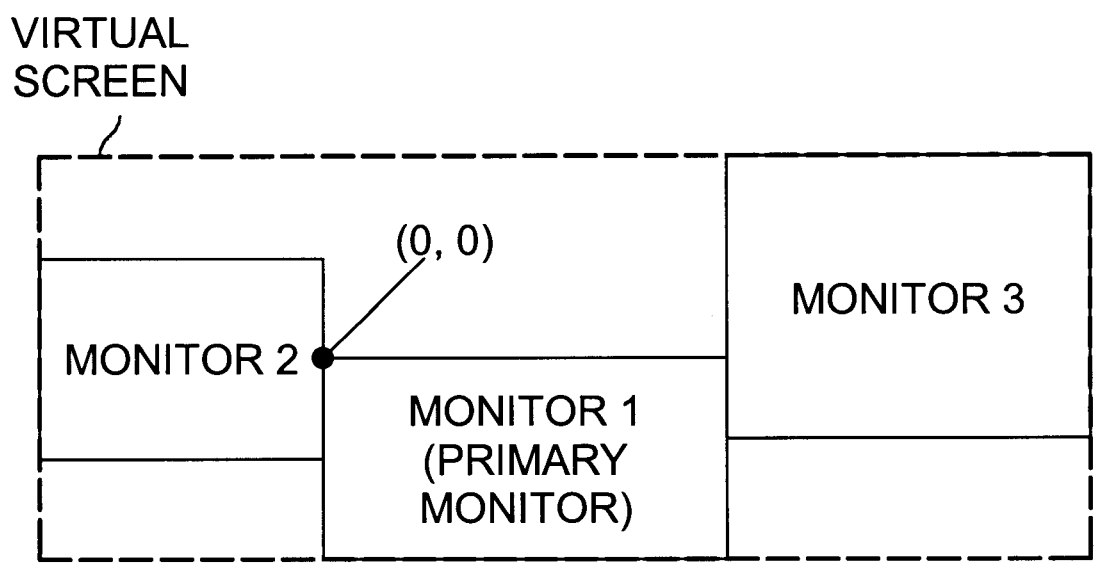
FIG. 9 is a diagram of multiple display monitors according to an embodiment of the present invention.

Some operating systems, such as Microsoft Corporation's Windows 98® and Windows 2000™, for example, support the concurrent use of multiple display monitors by a single computer system. In these operating systems, an unlimited number of display monitors may be supported per computer system. The monitors may be arranged in a way that creates a contiguous region. The size and color depth of each monitor may be set independently. The bounding rectangle of all monitors makes up a virtual screen. In such systems, the desktop window of the graphical user interface covers the virtual screen, rather than the screen of a single physical monitor. Because existing application programs expect one monitor with an origin of (0, 0), the virtual screen contains one monitor with the origin (0, 0). This monitor is known as the primary monitor. FIG. 9 is a diagram illustrating multiple display monitors and a virtual screen. Each physical display device may be represented by a monitor handle. A display monitor has the same monitor handle value through out its life. Selected operating system functions that return a display device context (DC) may return a DC for a monitor. A DC comprises an area of memory used as a non-visible drawing surface or frame buffer.

The capability for multiple display monitors in a system may be useful for implementing transparent graphics for the output data of an application program without employing modifications to the application program. According to an embodiment of the present invention, a primary monitor or display may be used for normal, non-transparent display data and a second monitor or display may be used for transparent display data. The primary display may be accessed by a primary display driver and the second display may be accessed by a transparency virtual display driver. However, the second display is virtual only; it does not exist as hardware in the system. In other embodiments, more than two monitors and associated display drivers may be employed. In one embodiment, the "continuous desktop" described above may be used to support automatic selection of a display monitor for transparent display operations. Selection of a monitor may be made by determining a drawing location within the virtual screen. In this way, an application program may not have to be aware of the multiple display monitors.

Figure 10:
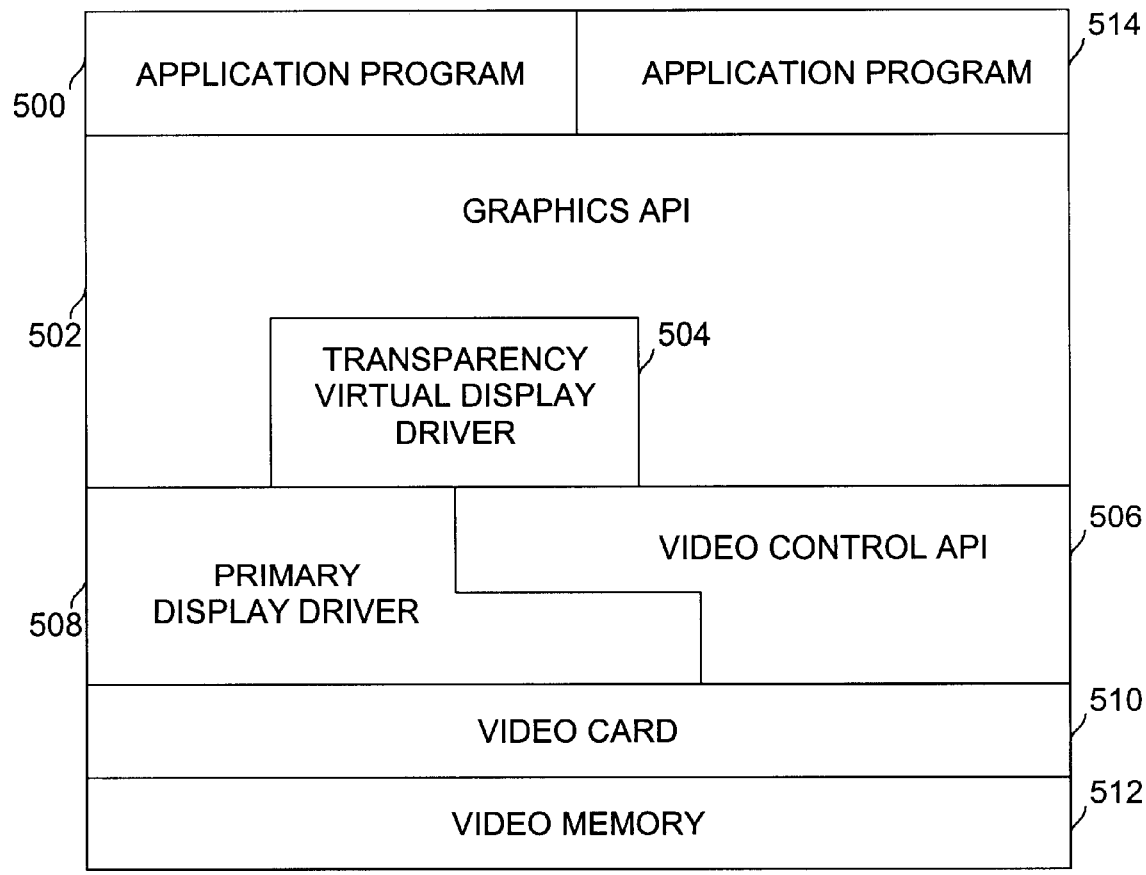
FIG. 10 is a diagram of an alternate software and hardware stack for implementing transparent graphics for an application without native transparency support according to another embodiment of the present invention.

FIG. 10 is a diagram of an alternate software and hardware stack for implementing transparent graphics for an application without native transparency support according to an embodiment of the present invention. In this embodiment, an application program or user may direct selected output data from the application program to be represented on a display in a transparent manner without employing modifications to the application program code. A "contiguous desktop" or separate desktops may be used to support selection of the transparency function. A user may position a window of an application program through the use of a mouse or other pointing device, which may result in a call to the operating system. An application program 500, which is not specifically designed and coded to create, use and destroy transparent display objects itself, may call functions provided by operating system graphics rendering application programming interface (graphics API) 502 in one embodiment in order to select transparent display of the output data of the application program. In some embodiments, selection of the multiple display monitors may be presented to a user through well-known selectable tabs in a display properties window of a control panel window. This allows a user to control monitor layout. In some operating systems, each application program may have a system control menu with an entry to allow output data from an application program to be sent to a specific display monitor. A particular one of the multiple display monitors may be a virtual monitor associated with transparent display output. In the Windows 95® and Windows 98® operating systems, the graphics API may be the Graphics Device Interface (GDI), available from Microsoft Corporation.

Graphics API 502 may initialize transparency virtual display driver 504 in response to the user selection of transparency to make available a virtual display to be written to by all application programs. Transparency virtual display device driver 504 calls video hardware control abstraction application programming interface (video control API) 506 in this embodiment. In the Windows 95® and Windows 98® operating systems, this may be the DirectDraw API, available from Microsoft Corporation. In some operating systems, graphics API 502 and video control API 506 may not be distinguishable from each other as they may exist within the same application programming interface. In this embodiment, graphics API 502 is aware that support for multiple display monitors is provided by the operating system. Transparency virtual display driver 504 may be used to render requested graphics to the transparent graphics frame buffer 18 shown in FIG. 1 indirectly by calling video control API functions to create display surfaces on the primary display. The video control API 506 may be used to control frame buffer visibility and to access the contents of all frame buffers. All frame buffers may be created by primary display driver 508. In this embodiment, graphics API 504 and video control API 506 interact with primary display driver software 508 to communicate with video card 510. Transparency virtual display driver 504 may also call primary display driver 508 to communicate with the video card. Video card 510 controls the video display in the system of FIG. 2. Video card accesses video memory 512 to obtain display data. Another application program 514 may also call graphics API functions in the well-known manner to display data.

Figure 11:
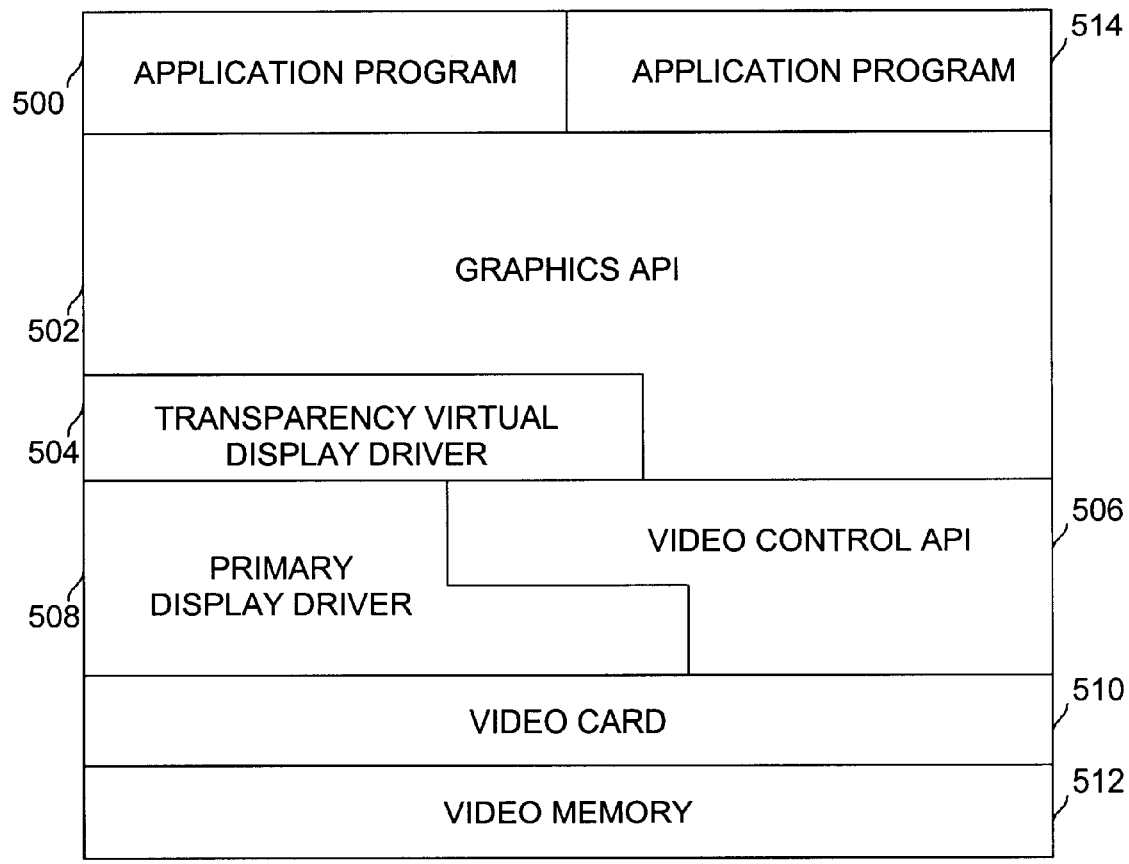
FIG. 11 is a diagram of yet another software and hardware stack for transparent graphics for an application without native transparency support according to another embodiment of the present invention.
Figure 12:
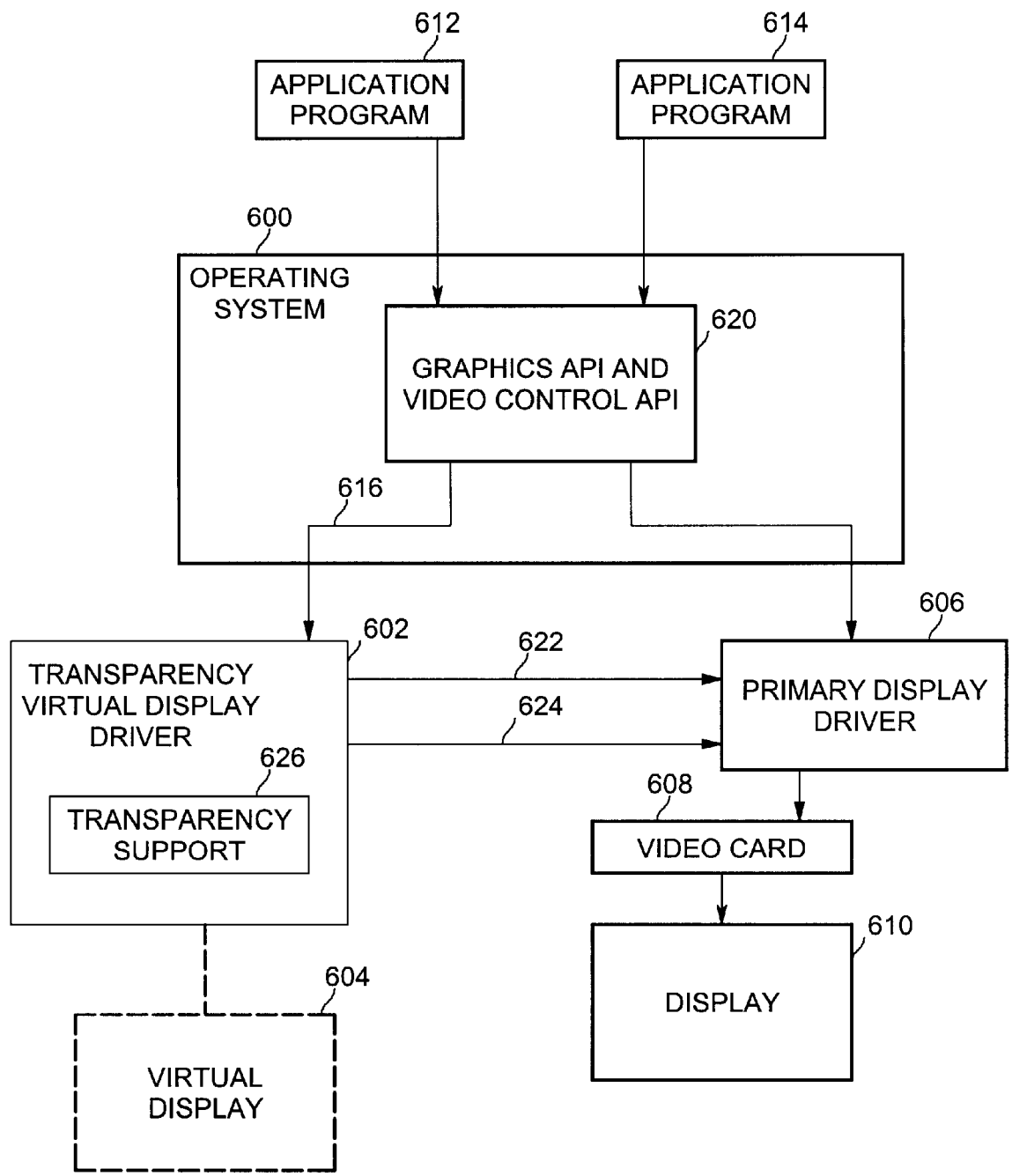
FIG. 12 is a diagram of a system architecture for implementing transparent graphics for an application without native transparency support according to another embodiment of the present invention.

FIG. 11 is a diagram of another alternate software and hardware stack for implementing transparent graphics for an application without native transparency support according to an embodiment of the present invention. In this case, the operating system does not provide support for multiple display monitors, such as in the Windows 95® operating system. Therefore, the primary display driver may be hidden from graphics API 502. Graphics API 502 may communicate with transparency virtual display driver 504 for all display driver function calls. FIG. 12 is a diagram of a system architecture for implementing transparent graphics for an application without native transparency support according to an embodiment of the present invention. In this embodiment, an application program or a user may direct selected output data to be represented on a display in a transparent manner without employing modifications to the application program code. A software component called a transparency virtual display driver 602 may be installed and be recognizable by the operating system. The operating system recognizes the transparency virtual display driver as a display driver component and may not be aware that transparency may be provided. In this embodiment, the transparency virtual display driver may be associated with a non-existent video card and virtual display 604. While the transparency virtual display driver is "visible" to application programs and operating system software components, no actual hardware is associated with it. As discussed above, some operating systems, such as Microsoft Corporation's Windows 98® and Windows 2000™, for example, support the concurrent use of multiple displays by a single computer system. When using such operating systems, a transparency virtual display driver 602 referencing a "virtual" video card may co-exist according to the operating system with a primary display driver 606 for an existing video card 608 and associated primary display 610.

However, rather than implementing transparency display requests by writing display data to an operating system output frame buffer, primary display driver 606 implements the requests by writing display data to a transparent graphics frame buffer. The frame buffers may be managed as disclosed above. In this embodiment, however, the interface between the application programs and the display drivers has been generalized so that an application program may direct display output data to be shown transparently by determining a location for drawing on the contiguous desktop or by user selection of a specific monitor. Thus, transparent display output may be provided without modifying the application program code to specifically support transparency.

For example, in FIG. 12, a user may interact with operating system 600 to select which application program(s) may be associated with each display device (or display monitor). For instance, application program 612 may be selected to produce transparent display output data for virtual display 604 and application program 614 may be selected to produce normal, nontransparent display output data for primary display 610. When a transparent virtual display is selected as the display monitor for an application program, graphics API and video control API components 620 within operating system 600 route display requests from application program 612 to transparency virtual display driver 602. Transparency virtual display driver calls primary display driver 606 over line 622 to create a memory-based display device context (DC). The DC is a non-visible drawing surface existing in video or system memory. The DC may be a transparent graphics frame buffer as shown in FIG. 1. The display monitor or "screen" of the transparent virtual display driver exists only as the memory-based DC (e.g., transparent graphics frame buffer). Transparency virtual display driver 602 routes all requests received on line 616 to draw to its virtual display to the memory-based DC controlled by primary display driver 606 via line 624. In this embodiment, all transparency support exists in a transparency support component 626 within the transparency virtual display driver, not in the application program. The transparent frame buffer may exist in non-displayed memory on video card 608 or in system memory.

In some embodiments of the present invention, multiple transparent virtual displays and associated transparent virtual display drivers may be provided, with each virtual display supporting a predetermined level of display transparency so that a user may select a desired level of transparency for a given application program or set of application programs. In another embodiment, multiple transparency virtual display drivers may be installed for a given virtual display, with each of the multiple transparency virtual display drivers using a different level of transparency (e.g., different degrees of alpha blending).

When a transparency virtual display driver (TVDD) is used in a system supporting multiple monitors, such as those employing operating systems such as Windows 98® and Windows 2000™, for example, installation, loading, execution, and mouse cursor control operations may be implemented as follows in accordance with one embodiment of the present invention.

Installation of the transparency capability proceeds with the user initiating the execution of an install program on the system. The install program copies TVDD files to the system's mass storage. The install program identifies a first existing primary display driver (PDD) in a monitor list in a system registry of the operating system. The install program adds a new TVDD to a monitor list in the registry with substantially the same settings as the first existing PDD. The install program repeats these steps as necessary for additional existing display drivers. The install program may then reboot the system.

The loading of transparency functionality proceeds with the operating system (OS) beginning its boot sequence. The OS loads the first PDD, requests the capabilities of this driver, and initializes the driver to gain access to the driver's frame buffer. The OS then loads the first TVDD and requests the capabilities of the TVDD. The first TVDD requests capabilities from the first PDD and returns them to the OS as the first TVDD's capabilities. The OS initializes the first TVDD. The first TVDD requests a transparent graphics frame buffer in system memory from the first PDD with properties substantially the same as the PDD's frame buffer (via the first PDD's access to the video control API). The first TVDD initializes its internal transparency support component 626 to provide transparency for the TVDD's transparent graphics frame buffer via line 624. The first TVDD returns to the OS a representation of its transparent graphics frame buffer. The OS then continues loading other display drivers as necessary.

Execution processing proceeds with a procedure call to the graphics API by the application program to draw to the screen of the system. The graphics API translates the drawing request into one or more display driver primitive operations. The OS decides, for each primitive, to which display driver they belong. The OS then makes a procedure call to the appropriate display driver to implement each primitive. If a selected display driver for the primitive is the PDD, the PDD performs normal display processing as is wellknown in the art. If a selected display driver is a TVDD, the TVDD fields the primitive and implements the primitive by drawing to the TVDD's transparent graphics frame buffer by calling an associated PDD to process the requested primitive. For example, if the TVDD is asked by the OS to draw a line from X to Y, the TVDD requests its associated PDD to draw a line from X to Y on the TVDD's transparent graphics frame buffer under the control of the PDD. The TVDD alerts its transparency support module that the transparent graphics frame buffer has been updated.

When a predetermined amount of time has passed or a predetermined amount of the TVDD's transparent graphics frame buffer has changed via graphics API draw primitives, the transparency support component mixes the contents of the transparent graphics frame buffer with those of the associated PDD's operating system output frame buffer. Mixed results may be placed on the PDD's visible display buffer (or onto a second buffer and subsequently flipped to the visible frame buffer).

When a contiguous desktop is provided, mouse cursor control processing proceeds with the user moving a mouse cursor for the system. The OS fields the interrupt generated by the movement of the mouse and determines which monitor the cursor is on. The OS then delivers a "new cursor position" call to the appropriate display driver. If the "new cursor position" call is delivered to the PDD, normal cursor processing may be performed and the PDD handles drawing the cursor on its own visible frame buffer. If the "new cursor position" call is delivered to a TVDD, the TVDD queries its associated PDD to draw the cursor at the requested position. This allows users to move the mouse cursor to a TVDD virtual display and interact with transparent applications belonging to it. Control may then be returned to the OS.

In one embodiment, when a TVDD's transparency support component mixes the contents of the frame buffers, the transparency support component may determine where the mouse cursor is on the display. If, and only if, the mouse cursor is over the TVDD's virtual display, the transparency support component may mix the frame buffers differently such that the contents of that TVDD's transparent graphics frame buffer appear to be a "solid" or non-transparent layer and the associated PDD's operating system output frame buffer appears to be the transparent layer. This allows the user to know that he or she is interacting with application programs on the TVDD virtual display rather than with application programs on the PDD's primary display.

Figure 13:
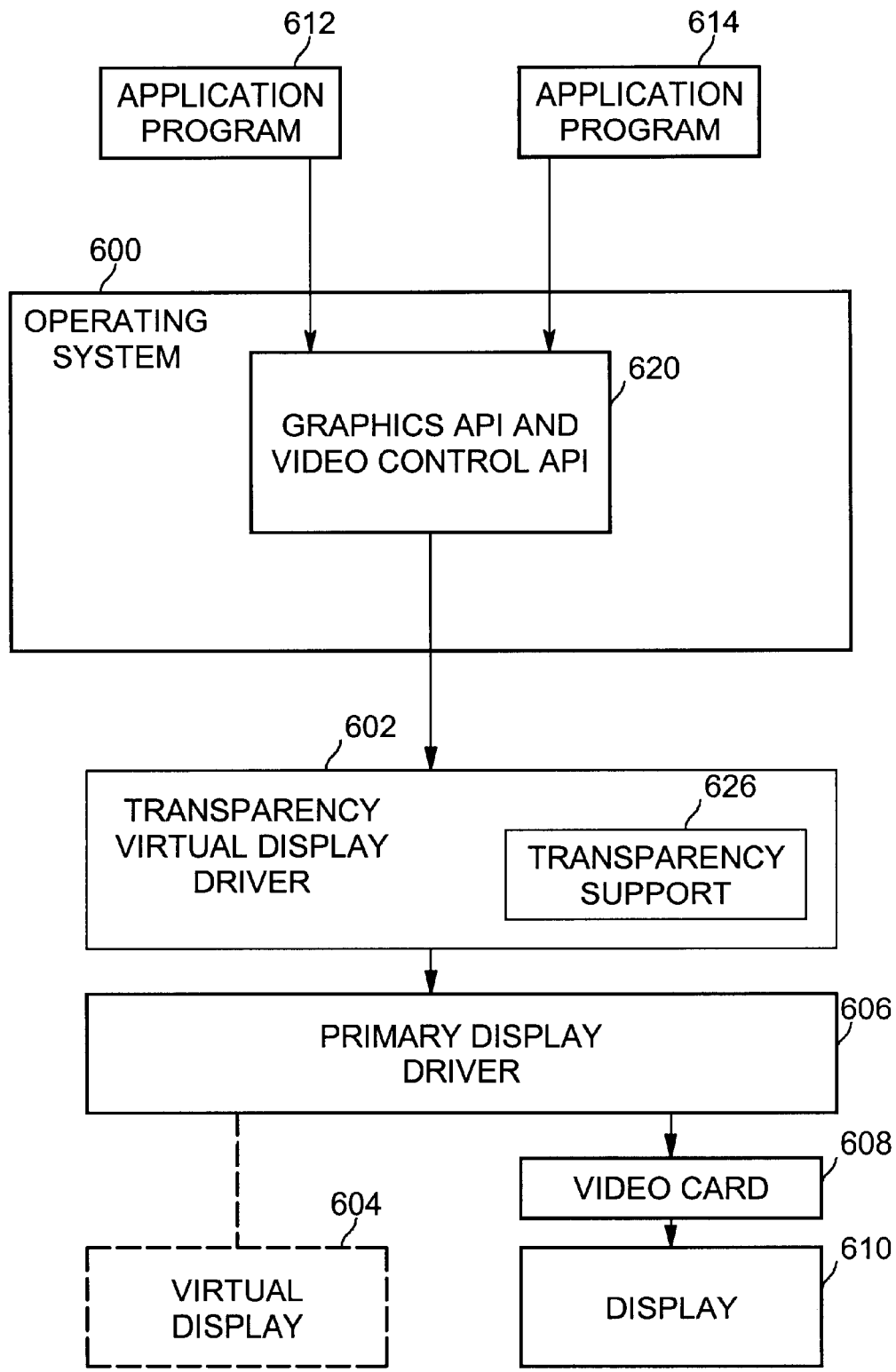
FIG. 13 is a diagram of a system architecture for implementing transparent graphics for an application without native transparency support according to yet another embodiment of the present invention.

When a transparency virtual display driver is used in a system that does not support multiple monitors, such as those employing the Windows 95® operating system, for example, installation, loading, execution, and mouse cursor control operations may be implemented as follows in accordance with one embodiment of the present invention. FIG. 13 is a diagram of a system architecture for implementing transparent graphics for an application without native transparency support according to yet another embodiment of the present invention. In this embodiment, all calls from graphics API and video control API 620 may be implemented by transparency virtual display driver 602, which in turn calls primary display driver 606.

Installation of the transparency capability proceeds with the user initiating the execution of an install program on the system. The install program copies TVDD files to the system's mass storage. The install program identifies the existing primary display driver (PDD) in the system registry. The install program stores the name and location of the existing PDD in a private storage area and places its own name in the existing PDD's place. The install program then changes attributes of the PDD in the registry by keeping its existing settings, but by doubling, for example, the screen width of the primary display. In other embodiments, other multiples of a screen width may be used. The install program may then reboot the system.

The loading of transparency functionality proceeds with the operating system (OS) beginning its boot sequence. The OS first loads the TVDD. The TVDD accesses the area of private storage and locates the PDD. The TVDD then loads the PDD. The OS next requests the capabilities of the TVDD. The TVDD requests the capabilities from the PDD and returns them to the OS, but doubles, for example, the screen width information. The OS initializes the TVDD. The TVDD initializes the PDD. The TDD requests a double width frame buffer in system memory from the PDD and passes it back to the OS as the combination operating system output frame buffer and transparent graphics frame buffer existing side by side. The TVDD initializes its internal transparency support component to provide transparency for applications in a certain portion of the double width virtual screen by using the double width frame buffer as both the transparent graphics frame buffer and the operating system output frame buffer.

Execution processing proceeds with a procedure call to the graphics API by the application program to draw to the screen of the system. The graphics API translates the drawing request into one or more display driver primitive operations. The graphics API then makes a procedure call to TVDD for each primitive. The TVDD requests the PDD to apply the primitive to the double width frame buffer. The TVDD alerts its transparency support module that the double width frame buffer has been updated. The TVDD then passes an appropriate return code to the OS. The values of the return code may depend on the primitive type and capabilities of the PDD.

When a predetermined amount of time has passed or a predetermined amount of the double width frame buffer has changed via graphics API draw primitives, the transparency support component mixes a first section (e.g., the left section) of the double width frame buffer (with a given alpha value) with a second section (e.g., the right section with non-transparent content). Mixed results may be placed on the PDD's visible display buffer (or onto a second buffer and subsequently flipped to the visible frame buffer). The use of first and second sections may be transposed depending on the position of the mouse cursor as discussed further below. In other embodiments, multiple sections may be used to support multiple levels of transparency (e.g., different degrees of alpha blending).

Mouse cursor control processor proceeds with the user moving a mouse cursor for the system. The OS fields the interrupt generated by the movement of the mouse and delivers a "new cursor position" call to the TVDD with the cursor position on the double wide virtual screen. If the cursor is on a first section (e.g., the right section) of the virtual screen, the first section of the screen may be treated as the "solid" or non-transparent section of the screen and the second section (e.g., the left section) as the transparent section of the screen. If the cursor is on the second section of the screen, the second section may be treated as the "solid" or nontransparent section and the first section as the transparent section. This arrangement allows application programs to receive input from either section of the screen and allows the user to know to which "layer" data is being inputted. The PDD may then be called to draw the cursor at a position equal to the cursor position over the non-transparent section of the double width virtual screen. For example, if the primary display width is X, then the virtual screen width is 2X. If the cursor is at position X+1, the right section of the screen may be the non-transparent section and the cursor would be drawn at position 1 (because it is one unit to the right of the threshold of the nontransparent section). Control may then be returned to the OS.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of creating transparent graphics for an application program lacking native transparency support comprising:

selecting a virtual display to receive display data output from the application program without changing the application program code;

displaying other display data non-transparently on a primary display;

drawing the display data on the virtual display; and representing the display data from the virtual display transparently on the primary display along with the other display data.

2. The method of claim 1, further comprising receiving the display data by a virtual display driver controlling the virtual display and forwarding the display data to a primary display driver controlling the primary display.

3. The method of claim 2, further comprising routing requests to display the display data from the application program by an operating system to the virtual display driver.

4. The method of claim 1, wherein drawing display data on the virtual display comprises storing the display data in a transparent graphics frame buffer.

5. The method of claim 4, further comprising storing the other data in an output frame buffer.

6. The method of claim 5, further comprising color mixing and interleaving pixel data of the transparent graphics frame buffer with pixel data from the output frame buffer to produce resulting pixel data, and displaying the resulting pixel data on the primary display.

7. The method of claim 4, wherein the transparent graphics frame buffer comprises a memory-based display device context.

8. The method of claim 1, further comprising providing a plurality of virtual displays, each virtual display supporting a different predetermined level of transparency.

9. The method of claim 8, wherein selecting comprises selecting one of the virtual displays to display data from the application program according to a desired level of transparency.

10. The method of claim 1, further comprising determining a location of a cursor and displaying the display data non-transparently on the primary display when the cursor location is on the virtual display and displaying the other display data transparently.

11. A system for creating transparent graphics for an application program lacking native transparency support comprising:

a virtual display driver to receive display data from the application program to be displayed transparently without changing the application program code;

a primary display to display the display data transparently and to display other display data non-transparently; and a primary display driver to control the transparent display of the display data received from the virtual display driver and the display of the other display data on the primary display.

12. The system of claim 11, further comprising a transparent graphics frame buffer to store display data to be displayed transparently.

13. The system of claim 12, wherein the transparent graphics frame buffer comprises a memory-based display device context.

14. The system of claim 11, further comprising an output frame buffer to store the other display data.

15. The system of claim 11, further comprising a plurality of virtual display drivers, each virtual display driver supporting a different predetermined level of transparency.

16. The system of claim 11, further comprising a graphics application programming interface to interconnect the virtual display driver and the primary display driver.

17. An article comprising a machine readable medium having stored therein a plurality of machine readable instructions executable by a processor, the machine readable instructions comprising instructions to select a virtual display to receive display data output from an application program without changing the application program code, to display other display data non-transparently on a primary display, to draw the display data on the virtual display, and to represent the display data from the virtual display transparently on the primary display along with the other display data.

18. The article of claim 17, further comprising instructions to receive the display data by a virtual display driver controlling the virtual display and to forward the display data to a primary display driver controlling the primary display.

19. The article of claim 17, further comprising instructions to route requests to display the display data from the application program to the virtual display driver.

20. The article of claim 17, wherein instructions to draw display data on the virtual display comprise instructions to store the display data in a transparent graphics frame buffer.

21. The article of claim 20, further comprising instructions to store the other display data in an output frame buffer.

22. The article of claim 21, further comprising instructions to color mix and interleave pixel data of the transparent graphics frame buffer with pixel data from the output frame buffer to produce resulting pixel data, and instructions to display the resulting pixel data on the primary display.

23. The article of claim 17, further comprising instructions to provide a plurality of virtual displays, each virtual display supporting a different predetermined level of transparency.

24. The article of claim 23, wherein instructions to select a virtual display comprise instructions to select one of the virtual displays to display data from the application program according to a desired level of transparency.

25. The article of claim 17, further comprising instructions to determine a location of a cursor and to display the display data non-transparently on the primary display when the cursor location is on the virtual display and displaying the other display data transparently.

* * * * *